Jan. 18, 1966  TADAO YOSHIDA  3,229,362
METHOD OF MANUFACTURING ENGAGING ELEMENTS
FOR CLASP SLIDE FASTENERS
Filed June 8, 1964  3 Sheets-Sheet 1
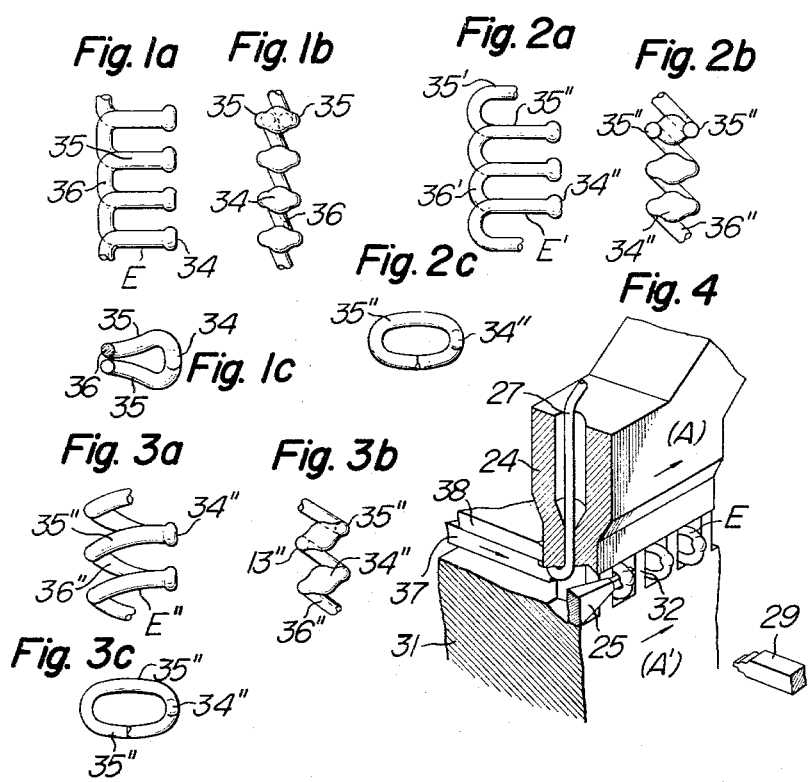

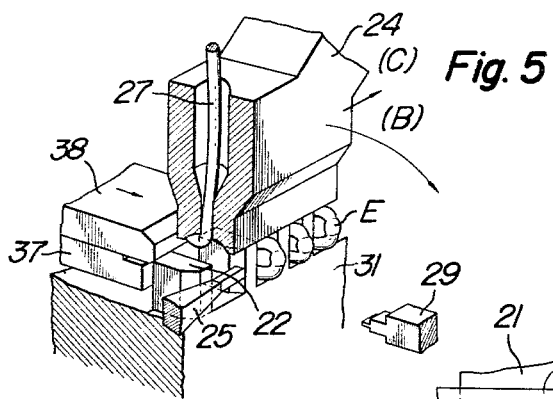
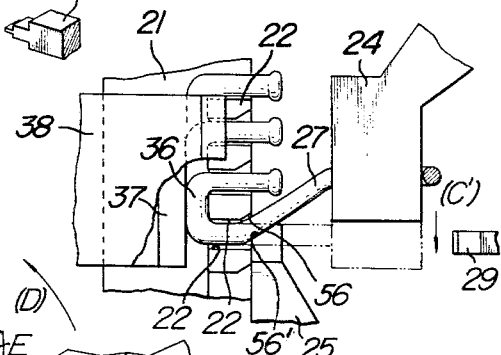
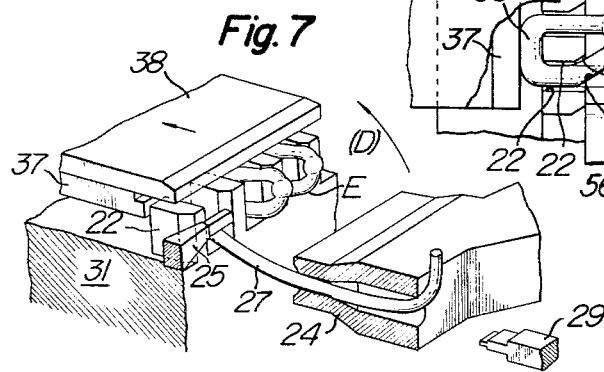
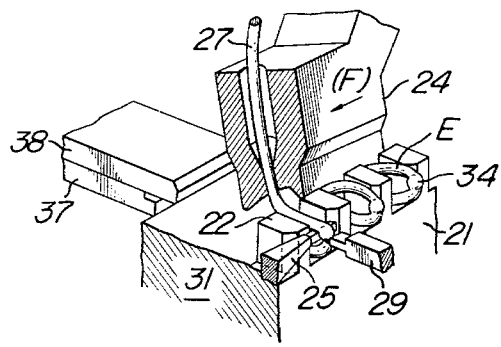

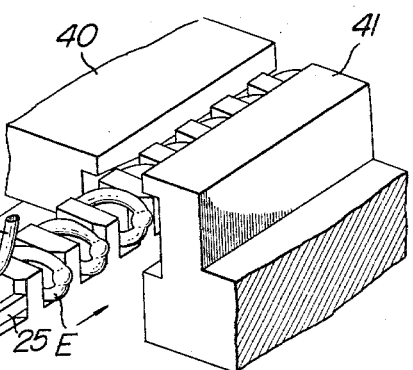
Fig. 10
Fig. 9
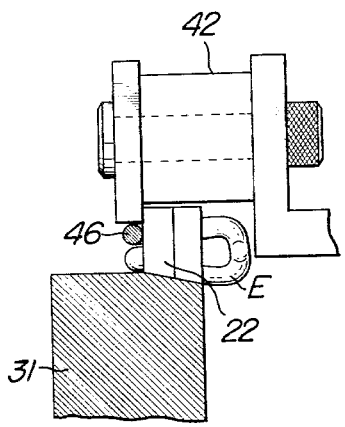
Fig. 11
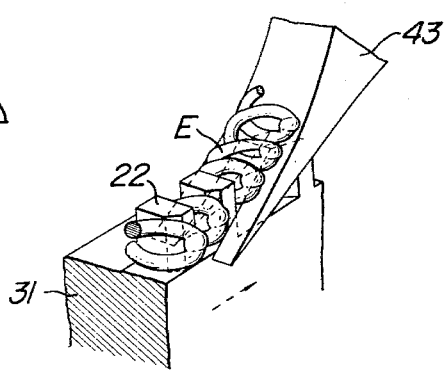
Fig. 12

United States Patent Office 3,229,362
Patented Jan. 18, 1966

3,229,362
METHOD OF MANUFACTURING ENGAGING
ELEMENTS FOR CLASP SLIDE FASTENERS
Tadao Yoshida, Tokyo, Japan, assignor to Yoshida Kogyo
K.K., Tokyo, Japan, a corporation of Japan
Filed June 8, 1964, Ser. No. 373,462
Claims priority, application Japan, June 7, 1963,
38/29,692; Sept. 16, 1963, 38/49,777
1 Claim. (Cl. 29—410)

The present invention relates to a method of manufacturing the engaging elements or fastener elements for clasp slide fasteners, which elements are made of thermoplastic synthetic resin materials, such as nylon.

In the conventional process of manufacturing the engaging elements made of synthetic thermoplastic resin materials for clasp slide fasteners, a wire of said material is wound about a stationary or rotary mandrel, then said wire is advanced by a pair of rotary screw rods or by travelling metallic means of comb shape, whereby said elements are formed.

In the method according to the present invention, a wire is continuously supplied to a guide member which undergoes an arcuate swinging motion in alternation with a reciprocating motion relative to a die having spaced parallel and aligned teeth. The die undergoes intermittent advancement in one direction by a distance equal to the pitch between adjacent teeth. The wire is caused to be successively wound in U-shaped form around the front end portion of a fixed hanger pin which is located adjacent the teeth of the die on one side thereof in alternation with a winding of the wire around the teeth of the die on the side thereof away from the pin to form successive loops. The portions which are wound around the hanger pin form engaging elements for the fastener device. A fastening portion is also formed on the engaging element of the slide fasteners and a rectifying step is optionally effected for final adjustment of the shape of the fastener of elements.

An object of the present invention is to provide a manufacturing method for slide fastener elements characterized, by a continuous process in which a supplied wire is formed into successive loops by an arcuately moving guide member which undergoes alternating reciprocating movement in conjunction with intermittent movement of a die having teeth, the fastening portions of the slide fastener elements being formed prior to or after the formation of said loops.

Further objects and advantages of the present invention will be understood from the following description explained in relation to the accompanying drawings, in which FIG. 1a is a plan view an engaging element produced in accordance with the present invention;

FIG. 1b is a top plan view of the engaging element shown in FIG. 1a;

FIG. 1c is a side view showing one turn of the engaging element shown in FIGS. 1a and 1b;

FIG. 2a is a plan view showing another engaging element produced according to the present invention;

FIG. 2b is a top plan view of the engaging element in FIG. 2a;

FIG. 2c is a side view showing one turn of the engaging element in FIGS. 2a and 2b;

FIG. 3a is a plan view showing still another engaging element according to the present invention;

FIG. 3b is a top plan view of the engaging element shown in FIG. 3a;

FIG. 3c is a side view showing one turn of the engaging element in FIGS. 3a and 3b;

FIG. 4 is a perspective view showing the die, the guide and the hammer for effecting the process of the present invention;

FIG. 5 is a perspective view of the elements of FIG. 4 during the forming operation of the engaging element;

FIG. 6 is a side view of the element of FIGS. 4 and 5 at another time of the forming operation of the engaging element;

FIG. 7 is a perspective view of the elements of FIGS. 4 to 6 at a time following that in the condition shown in FIG. 6;

FIG. 8 is a perspective view showing the elements at a time subsequent to the condition shown in FIG. 7;

FIG. 9 is a perspective view showing a rectifying device for the final adjustment of the engaging element produced by the process according to the present invention;

FIG. 10 is a sectional view showing the adjusting of the engaging element in the device of FIG. 9;

FIG. 11 is a perspective view showing adjustment of the engaging element by other means;

FIG. 12 is a perspective view showing the removing operation of the engaging element from the die.

In the drawing is shown in FIGS. 1a–1c a fastener element of a construction in which leg portions 35 of a fastening portion 34 are aligned horizontally and the curved connection portions 36 of both leg ends are in mutual close contact. FIGURE 4 shows a state immediately prior to the beginning of forming of a subsequent loop of the fastener element after a previous loop has been completed. Numeral 31 represents the front portion of a hanger pin adjacent to one side portion of the die 31, numeral 24 is a guide member for guidably conducting a wire 27. Numeral 29 is a hammer for forming the fastening portion, numeral 37 is a stopper with a cover 38 for holding the curved connection portion 36 of both leg ends of the fastener elements E in secured position by a pressing operation. One continued operation of said working members required for the formation of each of the loops is such that, as illustrated, the guide member 24 is positioned on the aligned teeth of the die 31, and the following steps are performed in the order described below from the state where the fastening portion 34 of a preceding loop has already been completed but is coiled about the front end portion of the hanger pin 25 as seen in FIG. 4.

From the position of FIG. 4 both the die 31 and the guide member 24 are advanced one pitch only of the teeth alignment in the directions as indicated by arrows A, A', respectively, at which time the fastening portion 34 of a preceding loop coiled about the front end portion of the hanger pin 25 is removed therefrom as illustrated in FIG. 5. Simultaneously the stopper 37 is pushed forward in the direction indicated by the arrow, whereby the curved connection portion 36 of the leg end of the fastener element is pressed so that the form of the preceding loop will not be disfigured by the forces applied to the subsequent loop during its formation.

Then, the guide member 24, which holds the inserted wire 27 is turned sidewise to the right as indicated by an arrow B, and is advanced as indicated by an arrow C simultaneously or at the termination of the sidewise turn thereof, the wire 27 reaching the bottom portion of a tooth through the gap between the bevel portion 56 of said tooth and the bevel portion 56' of the hanger pin 25 as shown in FIG. 6. By the retreating of the guide member 24 as indicated by arrow C' in FIG. 6, the wire is passed below the lower surface of the hanger pin 25 as shown in FIG. 7, and at the same time the cover 38 on the upper surface of the stopper 37 is slid to the right, thereby the loop already formed is prevented from slipping out of the space between adjacent teeth.

When the wire 27 is held in a tooth bottom portion of the die 31 and below the lower surface of the hanger pin 25, the guide member 24 is returned upwardly as indicated by arrow D, while simultaneously the hammer 29, is moved to the left as shown in FIG. 8, the stopper 37 and the cover 38 being withdrawn to the left. The wire 27 turns backwardly to a U-shape, as shown about the front end portion of the hanger pin 25 and the fastening portion 34 thereof is formed by the hammer 29. The formation of said fastening projections may, however, be performed prior to or after the formation in a separate process if desirable.

Next, when the guide member 24 is made to retreat further one pitch only as indicated by arrow F, the wire 27 passes the left side portion of the engaging tooth 22 of the next position and returns to its initial state as shown in FIG. 4, whereafter the operations illustrated in FIGS. 4–8 and described above are repeated, one unit of each loop being formed for each intermittent movement of the die 31.

The fastener elements formed by said operations are provided with a form substantially perfect, but in order to have the form thereof unified and the alignment of the teeth thereof accurately adjusted, they are transferred to a rectifying means as illustrated in FIGS. 9 and 10, and wherein the form of the loop and the parallel state of the teeth alignment is adjusted by means of pressing covers 40, 41 each having a cross-section of side-turned U-shape, which at the same time the leg end portions 46 are closely contacted as shown in FIG. 10. Subsequently, a pressing roll 42 as shown in FIG. 11 additionally causes contacting of the leg end portions 46 only. Consequently, the form of the fastener elements is corrected in stability and uniformity thereof, and finally after being cooled by an appropriate cooling means the fastener elements are detached from the moving die 31 by an inclined forked scraper 43 as illustrated in FIG. 12.

The fastener elements E of the form shown in FIGS. 1a–1c and described above are manufactured by the above fundamental steps, but the fastener elements E' shown in FIG. 2 in which the aligned horizontal leg portions 35' of each loop are connected by an inclined curved connector (36'). Said form is manufactured by omitting the transfer of the fastener elements to the rectifying means illustrated in FIGS. 9–11. Thus after finishing the formation steps shown in FIGS. 4–9 they may be immediately cooled and hardened and detached from the teeth of the die 31 by the scraper 43 to produce the elements of FIG. 2.

The fastener elements E" as shown in FIG. 3 also in which both leg portions 36" and 35" of the fastening portion 34" are inclinedly parallel and the loops are continuously connected in a spiral form with equal spacings can very easily be manufactured by very simple operations similar to those preceding by changing the form of each engaging tooth 22 on the die 31. Therefore if the form of the teeth of the die 31 and the construction of the leg rectifying means are properly altered, fastener elements of any other type can easily be manufactured.

In the method according to the present invention, the loop formation of the fastener elements can be performed very accurately and easily by operating the three working members, viz the die, the hanger pin, and the guide member, all very simple in construction, and in addition since the working steps after the loop formation are very simple, the present invention presents an excellent effectiveness in the high speed production of the coil-form fastener elements superior in accuracy, to say nothing of the extreme simplification of the construction of a fastener element manufacturing machine.

What is claimed is:

A method of manufacturing a fastener element of coil form from a continuously supplied wire, said method comprising engaging the wire in a guide member, alternately repeating an arcuate swinging motion with an intermediate reciprocating movement of the guide member while intermittently advancing a die having spaced teeth a distance equal to the pitch between adjacent teeth to successively wind the wire in U-shape form around a stationary hanger pin located adjacent the teeth on one side thereof in alternation with winding the wire around the teeth on the side thereto away from the pin to form successive loops.

References Cited by the Examiner

UNITED STATES PATENTS 3,106,749  10/1963  Streicher _____ 29—410 X
3,168,606   2/1965  Burbank _____ 264—281

WHITMORE A. WILTZ, *Primary Examiner.*

THOMAS H. EAGER, *Assistant Examiner.*